（12) United States Patent
Aschenbruck et al.

(10) Patent No.: US 7,175,385 B2
(45) Date of Patent: Feb. 13, 2007

(54) MOUNTING OF THE ROTOR OF A GAS TURBINE

(75) Inventors: Emil Aschenbruck, Duisburg (DE); Michael Blaswich, Oberhausen (DE); Andreas Kleinefeldt, Ratingen (DE); Ulrich Orth, Bottrop (DE)

(73) Assignee: MAN TURBO AG (DE)

( * ) Notice: Subject to any disclaimer, the term of this patent is extended or adjusted under 35 U.S.C. 154(b) by 170 days.

(21) Appl. No.: 11/007,817

(22) Filed: Dec. 8, 2004

(65) Prior Publication Data

US 2005/0129506 A1 Jun. 16, 2005

(30) Foreign Application Priority Data

Dec. 15, 2003 (DE) ................. 103 58 953

(51) Int. Cl.
*F01D 25/16* (2006.01)
(52) U.S. Cl. ...................... 415/107; 415/229
(58) Field of Classification Search ............... 415/104, 415/107, 229
See application file for complete search history.

(56) References Cited

U.S. PATENT DOCUMENTS

| 3,366,365 | A | | 1/1968 | Waheeb |
|---|---|---|---|---|
| 4,178,754 | A | * | 12/1979 | Earnest .................. 60/773 |
| 4,244,191 | A | | 1/1981 | Hendriks |
| 4,516,908 | A | | 5/1985 | Vinciguerra |
| 4,558,228 | A | | 12/1985 | Larjola |
| 4,585,396 | A | | 4/1986 | Kawamura et al. |
| 4,965,994 | A | | 10/1990 | Ciokajlo et al. |
| 5,481,145 | A | | 1/1996 | Canders et al. |
| 6,151,909 | A | * | 11/2000 | Carter et al. .................. 62/402 |
| 6,269,647 | B1 | | 8/2001 | Thompson, Jr. et al. |
| 6,455,964 | B1 | * | 9/2002 | Nims .......................... 310/90 |
| 6,571,563 | B2 | * | 6/2003 | Yim et al. ..................... 60/796 |

FOREIGN PATENT DOCUMENTS

| DE | 1200075 | 3/1966 |
|---|---|---|
| DE | 1476763 | 12/1970 |
| DE | 3214101 C2 | 11/1982 |
| DE | 3343203 A1 | 5/1984 |
| DE | 34 14 910 | 10/1985 |
| DE | 3940975 A1 | 6/1990 |
| DE | 3779709 T2 | 12/1992 |
| EP | 0 259 991 B1 | 3/1988 |
| EP | 0598183 B1 | 5/1994 |

OTHER PUBLICATIONS

Christof Lechner, Jörg Seume, 2003, Stationäre Gasturbinen, Springer Verlag 2003, pp. 720-723.
Oberg et al., 1996, 25th Edition Machinery's Handbook, 1996 Industrial Press Inc., New York.
The Center for Magnetic Bearings, Jul. 29-31, 1992, Proceedings of Mag '92 Magnetic Bearings, Magnetic Drives and Dry Gas Seals Conference & Exhibition, Technnomic Publishing Co., Inc.

* cited by examiner

*Primary Examiner*—Ninh H. Nguyen
(74) *Attorney, Agent, or Firm*—McGlew & Tuttle, PC

(57) ABSTRACT

The rotor (5) of a gas turbine containing a compressor part (1) and a turbine part (3) is mounted in an axial thrust bearing (19) and in two radial journal bearings (16, 17). One of the bearings is a journal bearing (16) arranged in the intake area of the compressor part (1) and the other journal bearing (17) together with the thrust bearing (19) is arranged in the area of the turbine part (3).

12 Claims, 3 Drawing Sheets

MOUNTING OF THE ROTOR OF A GAS TURBINE

CROSS REFERENCE TO RELATED APPLICATIONS

This application claims the benefit of priority under 35 U.S.C. § 119 of German Application DE 103 58 953.8 filed Dec. 15, 2003, the entire contents of which are incorporated herein by reference.

FIELD OF THE INVENTION

The present invention pertains to the arrangement for mounting the rotor of a gas turbine with a compressor part and a turbine part, wherein the rotor is mounted in an axial thrust bearing and in two radial journal bearings, of which one journal bearing is arranged in the intake area of the compressor part and the other journal bearing is arranged in the area of the turbine part.

BACKGROUND OF THE INVENTION

In prior-art gas turbine units (Ch. Lechner/J. Seume, *Stationäre Gasturbinen* [Stationary Gas Turbines], Springer-Verlag, 2003, pages 720–723), the thrust bearing used to axially fix the rotor is arranged in the intake area of the compressor part. This arrangement was always selected because the space requirement is comparatively favorable in the intake area of the compressor part and the thrust bearing is accessible there in a relatively simple manner. Since the thrust bearing requires considerably more oil than the radial journal bearing, the oil feed and oil drain lines can be accommodated in the intake area of the compressor part in a comparatively simple manner.

The components are heated during the operation of the gas turbine. The difference in the heating of the components leads to relative axial displacements between the rotor components and the stator components of the gas turbine. The relative axial displacements increase with increasing distance between the turbine components and the thrust bearing and lead to an increase in clearance between the rotor blade and the stator wall during the transition from the nonoperating state to the operating state of the gas turbine in case of shroudless and conical blades.

SUMMARY OF THE INVENTION

The basic object of the present invention is to design the mounting of a turbine rotor of this type such that the relative expansions between the turbine rotor and the stator of the turbine can be reduced and that the gap between these parts can thus be reduced.

According to the present invention an arrangement for mounting a rotor of a gas turbine is provided. The gas turbine has a compressor part and a turbine part, wherein the rotor is mounted in an axial thrust bearing and in two radial journal bearings. One of the journal bearings is arranged in the intake area of the compressor part. The other journal bearing is in the area of the turbine part. The thrust bearing is arranged in the area of the turbine part.

Even though up to now there have been good reasons for arranging the thrust bearing in the intake area of the compressor part of the gas turbine, the thrust bearing was moved according to the present invention into the area of the turbine part from the viewpoint of increased efficiency.

Due to the thrust bearing being arranged on the turbine side, the axial expansions of the turbine part are minimized. As a result, the clearance, which becomes established during the transition from the nonoperating state to the operating state between the rotor blades and the stator wall, is reduced. The reduced clearance leads to a reduction of the flow losses and consequently to an increase in efficiency.

At the same time, the larger amount of oil needed for the thrust bearing can be used for a more intense cooling of the bearing housing in the hot area of the turbine part. Such a more intense cooling of the bearing housing also contributes to meeting the requirement for increased turbine intake temperatures.

The thrust bearing and the journal bearing in the area of the turbine part may be designed, in principle, as separate bearings. However, it is also advantageous if the journal bearing and the thrust bearing are arranged together in the area of the turbine part.

Tilting segment bearings or even sliding surface bearings (such as disclosed in DE 3414910) are preferably provided as bearings. Furthermore, nonlubricated bearings, such as magnetic bearings, may be advantageously arranged. For special arrangements, the journal bearings may be designed as sliding surface bearings, while the thrust bearing is designed as a tilting segment bearing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

An exemplary embodiment of the present invention is shown in the drawings and will be explained in greater detail below. In the drawings.

DESCRIPTION OF THE PREFERRED EMBODIMENTS

Figure 1:
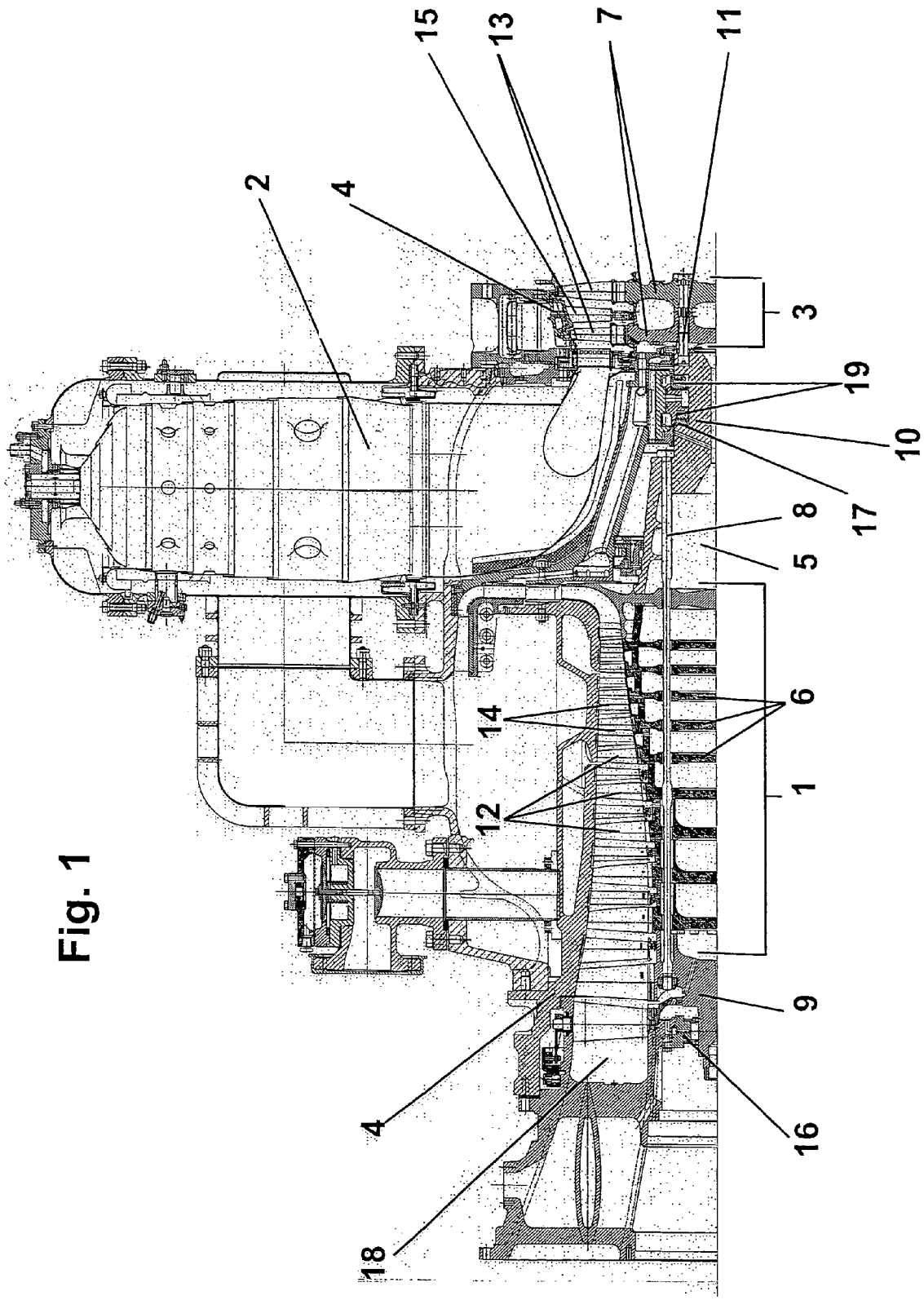
FIG. 1 is a sectional view showing half a longitudinal section through a gas turbine according to the invention.

Referring to the drawings in particular, the gas turbine comprises a compressor part 1, a combustion chamber 2 and a turbine part 3. A rotor 5, is composed of disks 6, 7 in the compressor part 1 and in the turbine part 3. The rotor 5 rotates within the turbine housing 4. The disks 6 of the compressor part 1 are connected with one another as well as with an end part 9 and with a rotor middle part 10 by bolts 8. The disks 7 of the turbine part 3 are likewise connected with one another and with the stator middle part 10 by bolts 11 passing through the disks. The disks 6, 7 carry rotor blades 12, 13 on their circumference. Guide vanes 14, 15 are fastened to the wall of the turbine housing 4. The guide vanes 14, 15 are arranged between the rotor blades 12, 13.

The rotor 5 is mounted in two radial journal bearings 16, 17. One journal bearing 16 is arranged in the intake area of the compressor part 1 and surrounds the end part 9 of the rotor 5, while the other journal bearing 17 is provided in the area of the turbine part 3 and surrounds the middle part 10 of the rotor. Furthermore, a thrust bearing 19, which absorbs the axial load of the rotor 5, is arranged in the area of the turbine part 3. The bearings are supplied with lubricating oil, which is made available via oil-carrying holes as well as oil feed and oil drain lines from the side of the turbine part 3. The lubricating oil ensures at the same time the intense cooling of the bearing arrangement.

Figure 2:
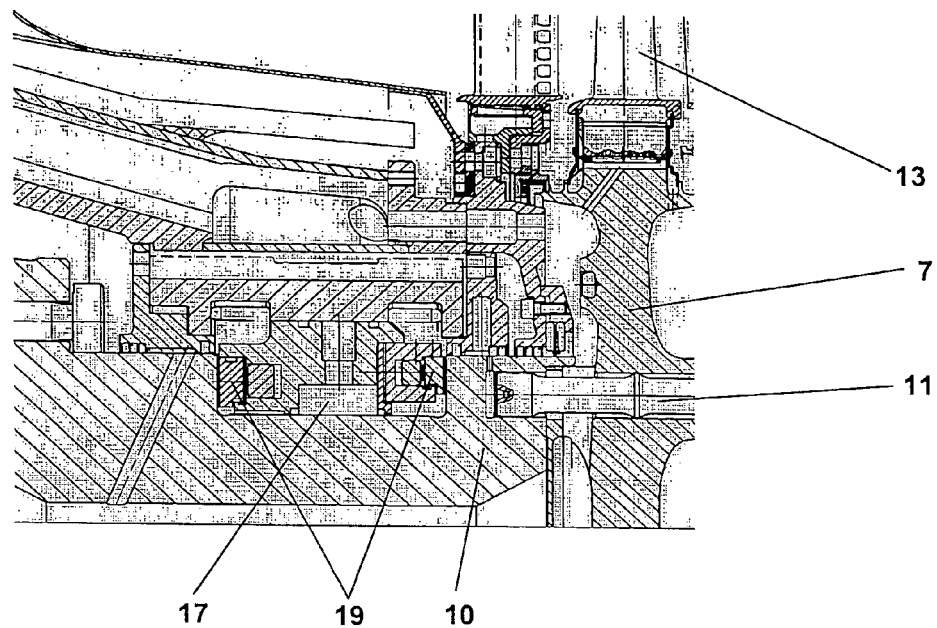
FIG. 2 is a sectional view showing the bearing arrangement as a detail on the turbine side.
Figure 4:
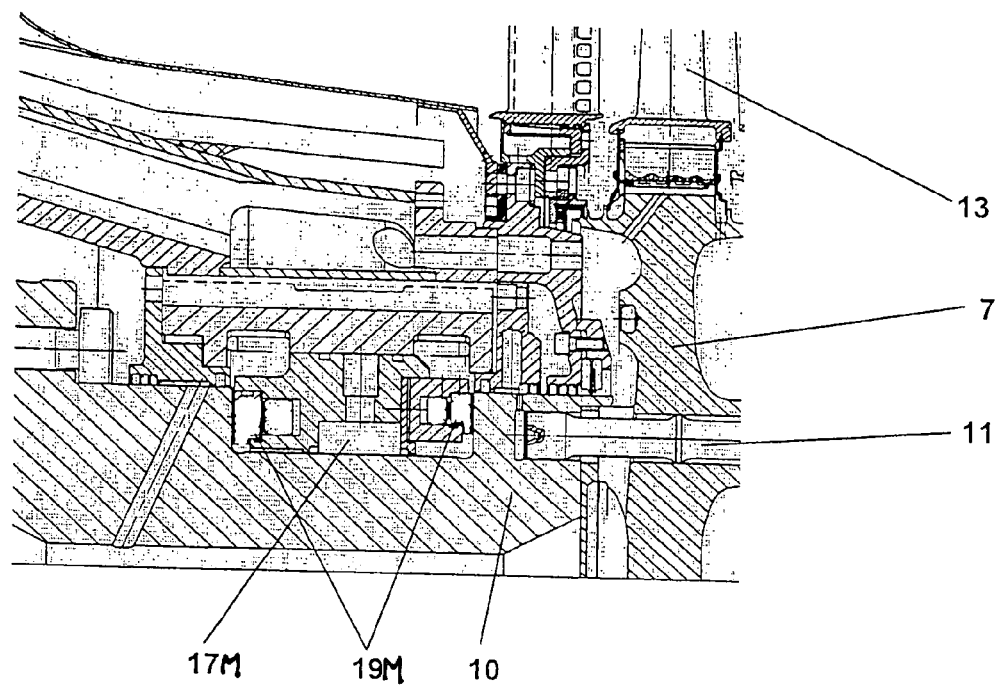
FIG. 4 is a schematic sectional view showing the magnetic bearing arrangement as a detail on the turbine side.
Figure 5:
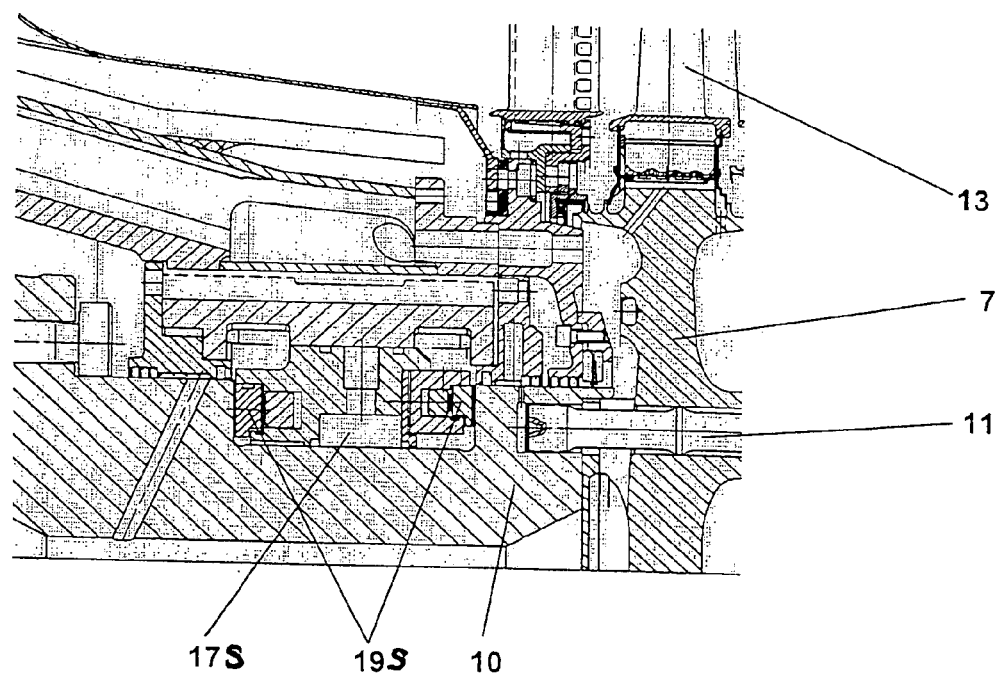
FIG. 5 is a schematic sectional view showing the bearing arrangement as a detail on the turbine side.

The bearing arrangement preferably contains tilting segment bearings 16, 17 and 19 as shown in FIGS. 1 and 2. However, it is also possible to use multisurface slide bearings such as slide bearings 17S and 19S as shown in FIG. 5, rolling bearings, magnetic bearings 17M and 19M as shown schematically in FIG. 4 or other types of bearings.

Figure 3:
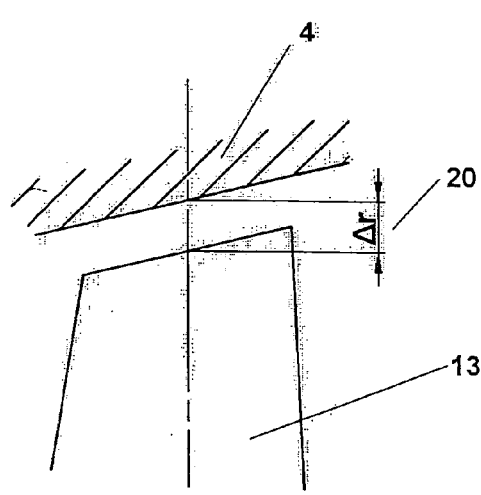
FIG. 3a is a sectional view showing a rotor blade in the nonoperating state of the turbine.
FIG. 3b is a sectional view showing the rotor blade in the operating state of the turbine.
Figure 3:
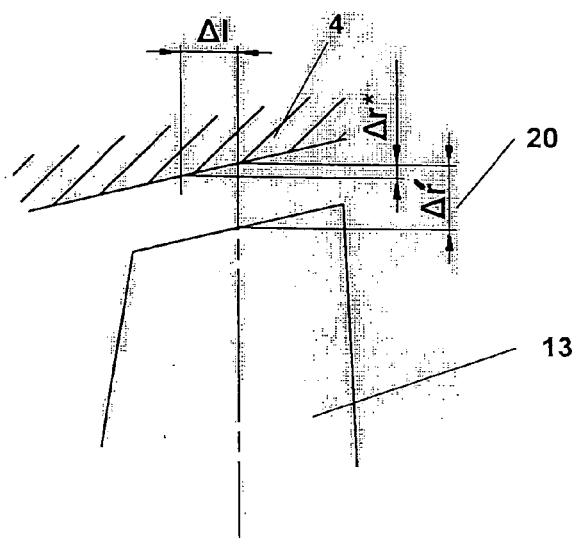

Due to the fact that the thrust bearing 19 is arranged in the area of the hot turbine part 3, unlike in the prior-art design, the longitudinal axial expansion of the rotor 5 in the turbine area, which is due to thermal effects, is limited. The advantage this entails is schematically illustrated in FIGS. 3a and 3b. The rotor blades 13 of the turbine part 3 are made conical and without an outer shrouding. There is a clearance 20 of a predetermined size Ar between the tips of the rotating rotor blades 13 and the wall of the stationary turbine housing 4 in the nonoperating state of the gas turbine (FIG. 3a). If the gas turbine is changed over from the nonoperating state into the operating state (FIG. 3b), the rotor 5 undergoes a longitudinal thermal expansion $\Delta 1$ in the axial direction because of the temperature load.

If, as is intended, the thrust bearing 19 is arranged on the side of the turbine part 3 facing the compressor part 1, the longitudinal axial expansion $\Delta 1$ leads to an increase in clearance 20 by the value $\Delta r^*$ to the value $\Delta r'$ in case of conical rotor blades 13. Such an increase in clearance 20 leads to flow losses and consequently to a reduction of the efficiency of the gas turbine. Due to the arrangement according to the present invention of the thrust bearing 19 in the area of the turbine part 3, the increase in the clearance 20 because of the longitudinal axial expansion of the rotor 5 can be kept within narrower limits, as a result of which an improvement is achieved in the efficiency of the gas turbine.

While a specific embodiment of the invention has been shown and described in detail to illustrate the application of the principles of the invention, it will be understood that the invention may be embodied otherwise without departing from such principles.

What is claimed is:

1. An arrangement for mounting the rotor of a gas turbine, the arrangement comprising:
   a rotor with an axial compressor part having an intake area, with an axial turbine part spaced axially from said axial compressor part by a middle part;
   an axial thrust bearing;
   a first radial journal bearing; and
   a second radial journal bearing, said rotor being supported in rotation by said axial thrust bearing and said first and second radial journal bearings, said first journal bearings being arranged in said intake area of said axial compressor part and said second journal bearings being arranged in an area of said axial turbine part and said thrust bearing being arranged in the area of said axial turbine part.

2. An arrangement for mounting a rotor of a gas turbine in accordance with claim 1, wherein said thrust bearing is arranged in the area of the turbine part together with said another of said journal bearings.

3. An arrangement for mounting a rotor of a gas turbine in accordance with claim 1, wherein tilting segment bearings are arranged as said axial thrust bearing and two radial journal bearings.

4. An arrangement for mounting a rotor of a gas turbine in accordance with claim 1, wherein sliding surface bearings are arranged as said axial thrust bearing and two radial journal bearings.

5. An arrangement for mounting a rotor of a gas turbine in accordance with claim 1, wherein said magnetic bearings are used as said axial thrust bearing and two radial journal bearings.

6. An arrangement for mounting a rotor of a gas turbine in accordance with claim 1, wherein sliding surface bearings are arranged as said journal bearings and a tilting segment bearing is provided as said thrust bearing.

7. A gas turbine arrangement, the arrangement comprising:
   a rotor having a compressor part and an axial turbine part, said compressor part and said axial turbine part being spaced apart axially by a rotor middle part, said compressor part compressing gas in an axial direction between an inlet spaced axially from an outlet;
   an axial thrust bearing;
   a first radial journal bearing; and
   a second radial journal bearing, said rotor being supported in rotation by said axial thrust bearing and said first and second radial journal bearing, said first radial journal bearing being arranged in an intake area of said compressor part, said second journal bearing and said thrust bearing supporting said rotor in rotation in an area of said axial turbine part surrounding said middle part of said rotor.

8. An arrangement in accordance with claim 7, wherein said thrust bearing is arranged in the area of the turbine part together with said second journal bearing.

9. An arrangement in accordance with claim 7, wherein tilting segment bearings are arranged as said axial thrust bearing and two radial journal bearings.

10. An arrangement in accordance with claim 7, wherein sliding surface bearings are arranged as said axial thrust bearing and two radial journal bearings.

11. An arrangement in accordance with claim 7, wherein said magnetic bearings are used as said axial thrust bearing and two radial journal bearings.

12. An arrangement in accordance with claim 7, wherein sliding surface bearings are arranged as said journal bearings and a tilting segment bearing is provided as said thrust bearing.

* * * * *